(12) United States Patent
Hsu et al.

(10) Patent No.: US 6,216,988 B1
(45) Date of Patent: Apr. 17, 2001

(54) INTEGRATED WRIST REST

(75) Inventors: Jimmy Ming-Der Hsu; Peter Y. Hsu, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,712

(22) Filed: Jun. 24, 1999

(51) Int. Cl.$^7$ ...................................................... B68G 5/00
(52) U.S. Cl. .................... 248/118; 248/118.1; 248/118.5; 400/715
(58) Field of Search ................... 248/118, 118.1, 248/118.5; 400/718, 719, 715, 472

(56) References Cited

U.S. PATENT DOCUMENTS

| | | |
|---|---|---|
| 5,570,268 | 10/1996 | Selker . |
| 5,596,481 * | 1/1997 | Liu et al. .......................... 248/118.1 |
| 5,713,544 * | 2/1998 | Wolf et al. ............................ 248/118 |
| 5,971,332 * | 10/1999 | Sun et al. ............................. 248/118 |
| 5,980,143 * | 11/1999 | Bayer et al. ......................... 400/715 |
| 6,017,006 * | 1/2000 | Cherubini et al. .................... 248/118 |

* cited by examiner

*Primary Examiner*—Leslie A. Braun
*Assistant Examiner*—A. Joseph Wujciak
(74) *Attorney, Agent, or Firm*—Leslie A. Van Leeuwen; Strasburger & Price, LLP

(57) ABSTRACT

A padded wrist rest that is integral with a portable electronic device, meaning that the wrist rest is sold with the device and does not have to be removed from the device to close and store the device, is disclosed. While integral to the portable electronic device, the wrist rest of the present invention can be removed by the user or owner of the portable electronic device for maintenance or replacement. The wrist rest may be single- or multiple-part, and includes one or more pads manufactured from encapsulated gel, closed-cell foam, fabric-covered padding, vinyl-covered padding, or leather-covered padding. The wrist rest may include one or more bases that are slid, screwed, or snapped into place on the portable electronic device.

11 Claims, 9 Drawing Sheets

INTEGRATED WRIST REST

FIELD OF THE INVENTION

The present invention relates to the field of portable computers and other electronic, information devices, and more particularly, to an integrated wrist rest for such devices.

DESCRIPTION OF THE RELATED ART

Current portable computers (laptops and notebooks) and other electronic information devices with keyboard-type user interfaces do not offer much in the way of wrist rests. These devices typically have no wrist rest at all, or they may have a surface area on the lower portion of the molded keyboard bezel that includes a sprayed or painted coating, or a glued-on foam-like or plastic material. Unfortunately, the materials used on these wrist rest areas in current devices are prone to tearing off, bubbling-up, scratching, or wearing off through normal use. When this happens, the wrist rest material cannot be replaced by the user. Rather, the user is required to either continue to use the device with the damaged or worn wrist rest area, or send the device back to the manufacturer and have the entire keyboard bezel replaced.

Moreover, packaging difficulties in portable electronic devices have forced designers of current integrated wrist rests to sacrifice user comfort and wrist rest functionality. A sprayed-on or painted-on coating in the wrist rest area does not significantly increase the user's comfort, and offers little protection from wrist and hand injuries due to repetitive keystroking.

A padded wrist rest that is integral to the device would improve the marketability of portable computers and other devices because it would make the use of that device more convenient and more comfortable, particularly for frequent users who may be susceptible to repetitive-motion type injuries such as carpal tunnel syndrome and tendonitis. An integral wrist rest is preferable to an after-market, detachable wrist rest, because an integral wrist rest allows the user to simply open the device and begin typing. In contrast, detachable wrist rests for laptops and notebook computers are commonly attached to the computer by the user after it is opened, and must be removed in order to close and store the computer. Detachable wrist rests are much less convenient, because they must be assembled with the computer for use, and because they add to the cords, batteries, disks, and other computer paraphernalia that must be carried around by the portable computer user. In addition, users may find the attachment/removal process of removable wrist rests so inconvenient that they forgo using them at all.

The present invention addresses these deficiencies by providing an integrated wrist rest for use in portable electronic devices, where the wrist rest is padded for the user's comfort and protection. Moreover, the present invention is more convenient than existing integral wrist rests used in portable electronic devices, because it can be removed by the user and replaced when it becomes worn or damaged. Finally, the present invention can be constructed from a material that sinks unwanted heat from the user and provides shock protection for the electronic device's display area.

SUMMARY

The present invention is an integral, padded wrist rest that is designed for use with a laptop or notebook computer, or other electronic device that employs a user interface that requires extensive or repetitive hand or finger movements. The wrist rest is integral with the electronic device, meaning that the wrist rest is sold with the device and does not have to be removed from the device to close and store the device. While the present invention is not intended to be removed in the normal course of use, it can be removed and replaced by an ordinary user with ordinary mechanical skills, using either no tools or ordinary household tools.

The present invention comprises a pad preferably manufactured from encapsulated gel, which also serves to sink unwanted heat away from the user, or it can be manufactured from closed-cell foam, fabric-covered padding, vinyl-covered padding, or leather-covered padding, that is coupled to the electronic device. These materials may also provide shock protection for the electronic device's display area. The present invention may also include a base having a lower surface and an upper surface, in which case the pad is coupled to the upper surface of the base. The base is then either slid, screwed or snapped into the portable electronic device, which includes structure that captures and holds the base-and-pad assembly to the device.

BRIEF DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention comprises a padded wrist rest designed for use with laptop computers, notebook computers, and other portable electronic devices that have a keyboard-type computer interface. The padded wrist rest of the present invention is integral to the device, meaning that it is not intended to be removed in the normal course of use of the device, but it is removable by the user for maintenance or replacement. This disclosure describes numerous specific details that include specific physical configurations to provide a thorough understanding of the present invention. One skilled in the art will appreciate that one may practice the present invention without these specific details. In addition, while this disclosure focuses on the application of the present invention to the laptops and notebook computers, one skilled in the art will recognize that the present invention can be also be applied in the context of any electronic device that includes a keyboard or other user interface wherein a wrist rest would increase the user's comfort and convenience.

Figure 1:
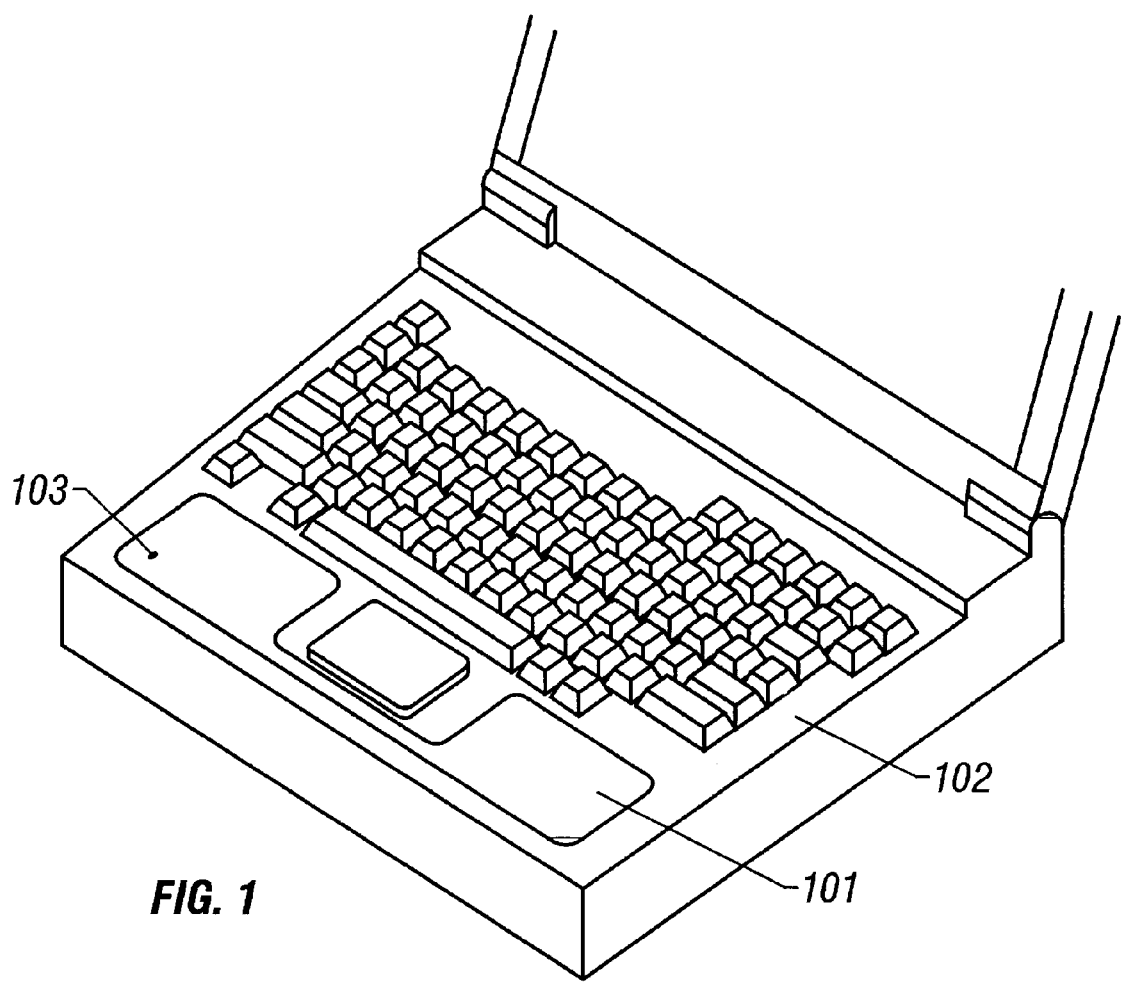
FIG. 1 shows a currently available notebook computer with an integral wrist rest area that is not padded.

FIG. 1 shows a typical current integral wrist rest design in the context of a currently available portable computer. As shown in FIG. 1, the wrist rest area 101 is simply the lower portion of the keyboard bezel 102, covered with a sprayed-on or painted-on coating 103 that does not provide significant padding or support for the user's wrists. When the coating 103 becomes worn or damaged, the user is obliged to send the entire unit back to the manufacturer for replacement of the keyboard bezel 102.

Figure 2A:
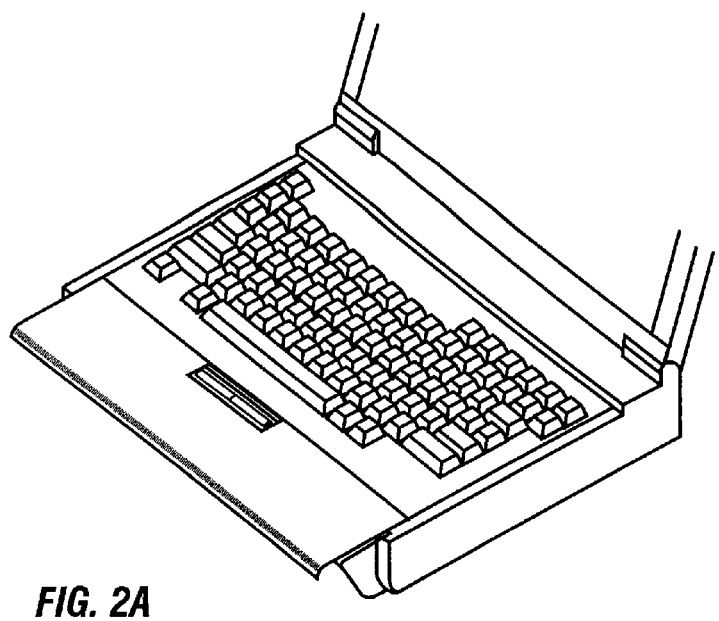
FIGS. 2A, 2B, and 2C show three embodiments of a non-integral, detachable wrist rest designed for use with portable computers.
Figure 2B:
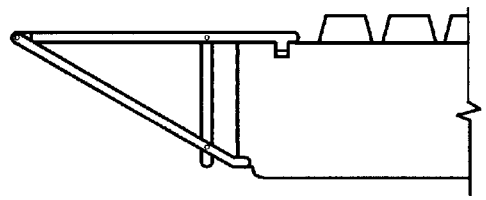
Figure 2C:
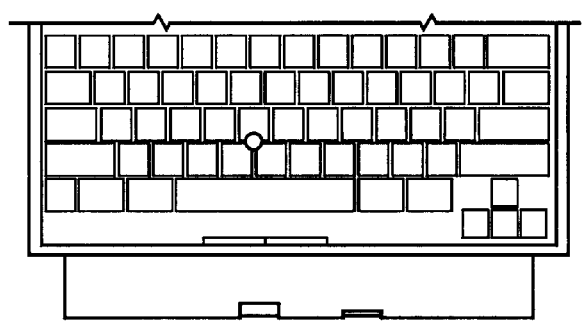
Figure 2C:
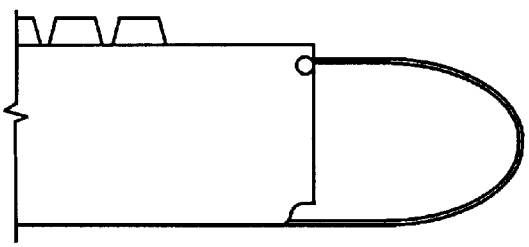

FIGS. 2A, 2B, and 2C show three typical current detachable wrist rests for use with a notebook computer that does not have an integral wrist rest area. As FIGS. 2A, 2B, and 2C show, there are a number of ways that designers have tried to address the need for a wrist rest in notebook computers, with varying degrees of effectivity. While these detachable wrist rests are likely more comfortable for the user than the integral design shown in FIG. 1, the attachment/detachment process is inconvenient and could result in the user forgoing the use of a wrist rest altogether. Moreover, like the integral wrist rest area shown on the notebook computer in FIG. 1, the detachable wrist rests in FIGS. 2A, 2B, and 2C lack any significant padding.

Figure 3:
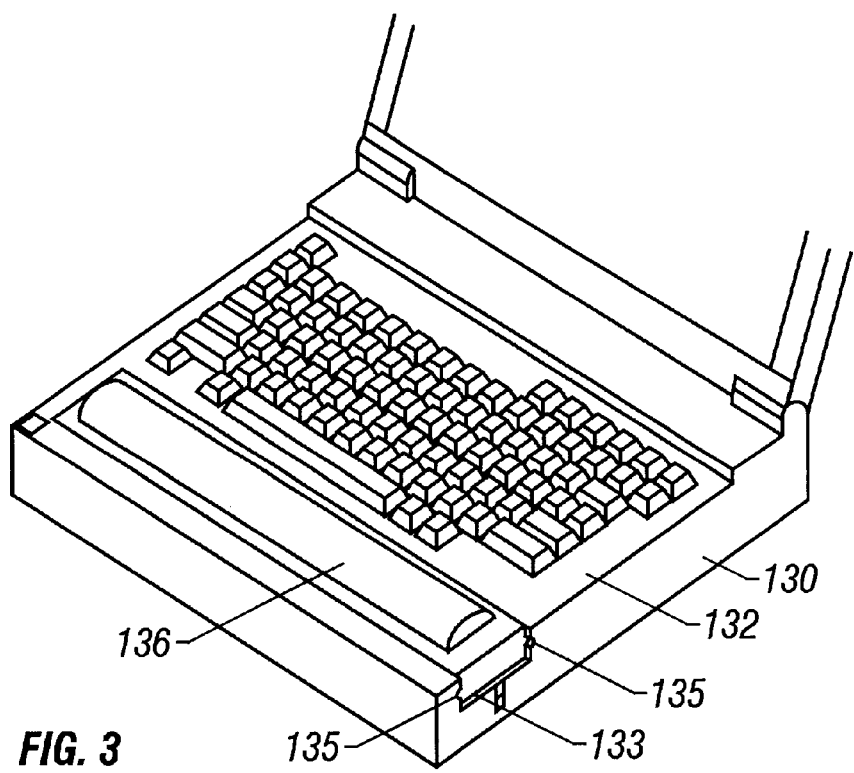
FIG. 3 shows a preferred embodiment of the present invention in a notebook computer application.

FIG. 3 shows a preferred embodiment of the present invention in a notebook computer application. FIG. 3 shows notebook computer 130, which includes keyboard bezel 132. Keyboard bezel 132, which can be a molded plastic bezel as is typical of most current notebook computers, includes a molded in recess 133 across the lower front portion of the computer. Molded-in recess 133 includes two molded-in slots 135 that run the length of the long sides of molded-in recess 133. As shown in FIG. 3, padded wrist rest assembly 136 couples to the notebook computer 130 at recess 133. Padded wrist rest assembly 136 is sized such that it does not interfere with a user's ability to close notebook computer 130.

Figure 4A:
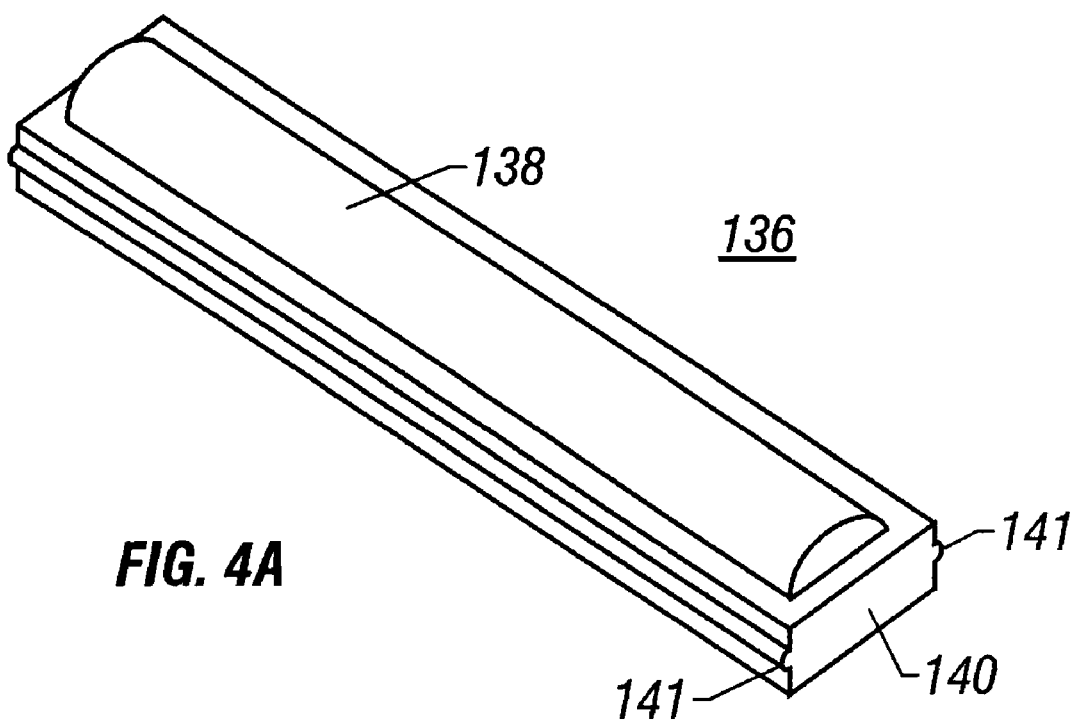
FIGS. 4A and 4B show two embodiments of the wrist rest pad assembly.

FIG. 4A shows a preferred embodiment of padded wrist rest assembly 136. As shown in FIG. 4A, padded wrist rest assembly 136 includes a pad 138 coupled to a base 140. Pad 138 can be manufactured from a variety of materials designed to enhance the user's comfort and in keeping with the overall target price of the notebook computer. In a preferred embodiment, pad 138 comprises encapsulated gel of the type currently used to increase comfort in bicycle seats and gloves. In this embodiment, the gel also serves to sink unwanted heat away from the user. Alternatively, pad 138 may be comprised of closed cell foam or padding covered with fabric, plastic, vinyl, or leather. Pad 138 is preferably coupled to base 140 via an adhesive compatible with the material from which pad 138 is manufactured.

Figure 5A:
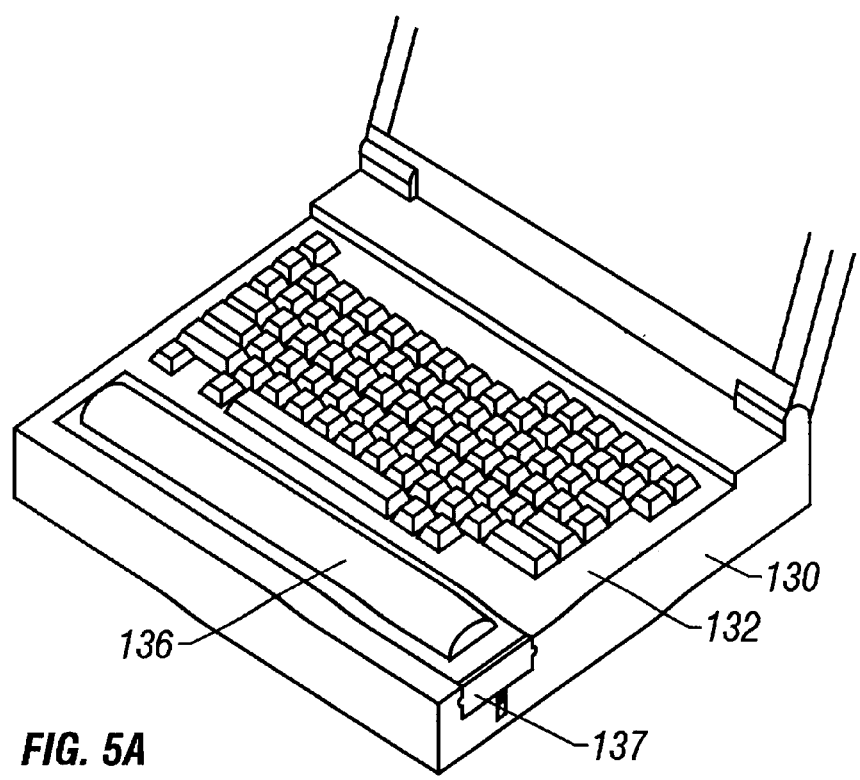
FIG. 5A shows the pad assembly embodiment of FIGS. 3 and 4A, as installed in a notebook computer application.

Base 140 is preferably manufactured from the same moldable material as keyboard bezel 132. As shown in FIG. 4A, base 140 includes tabs 141 that run along the two long sides of base 140. The padded wrist rest assembly 136 is installed into the notebook computer 130 by sliding the padded wrist rest assembly 136 into recess 133 at the side of the computer, such that tabs 141 engage slots 135. As shown in FIG. 5A, the installation of padded wrist rest assembly 136 shown in FIG. 4A is completed by installing retainer 137 in place over the end of padded wrist rest assembly 136. Retainer 137 is preferably a molded plastic snap-in cover similar to snap covers used to cover battery compartments in toys and electronic devices such as calculators. Retainer 137 can be wholly removable from computer 130, or it can be hingedly or slidably coupled to computer 130 in such a manner as to prevent its loss when padded wrist rest assembly 136 is removed and/or replaced.

Figure 4B:
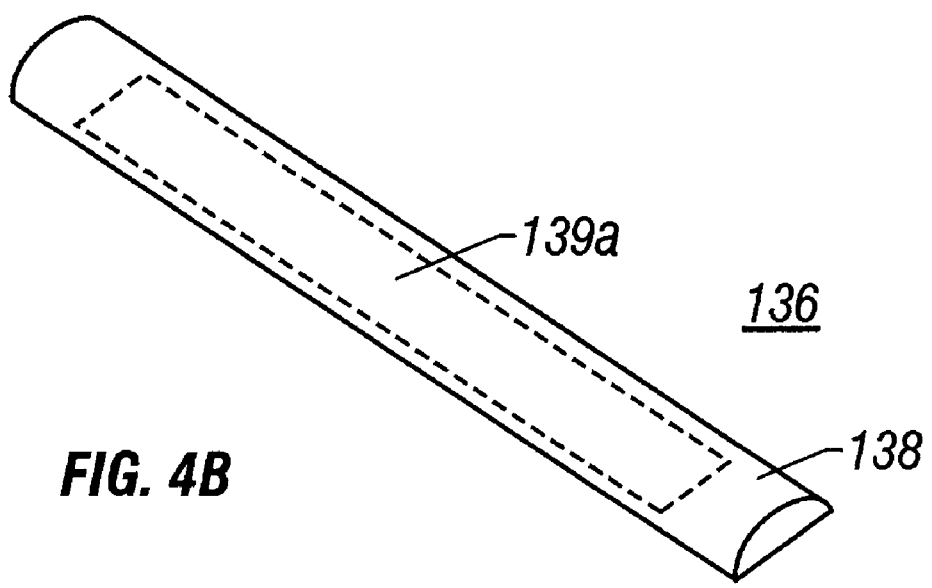
Figure 5B:
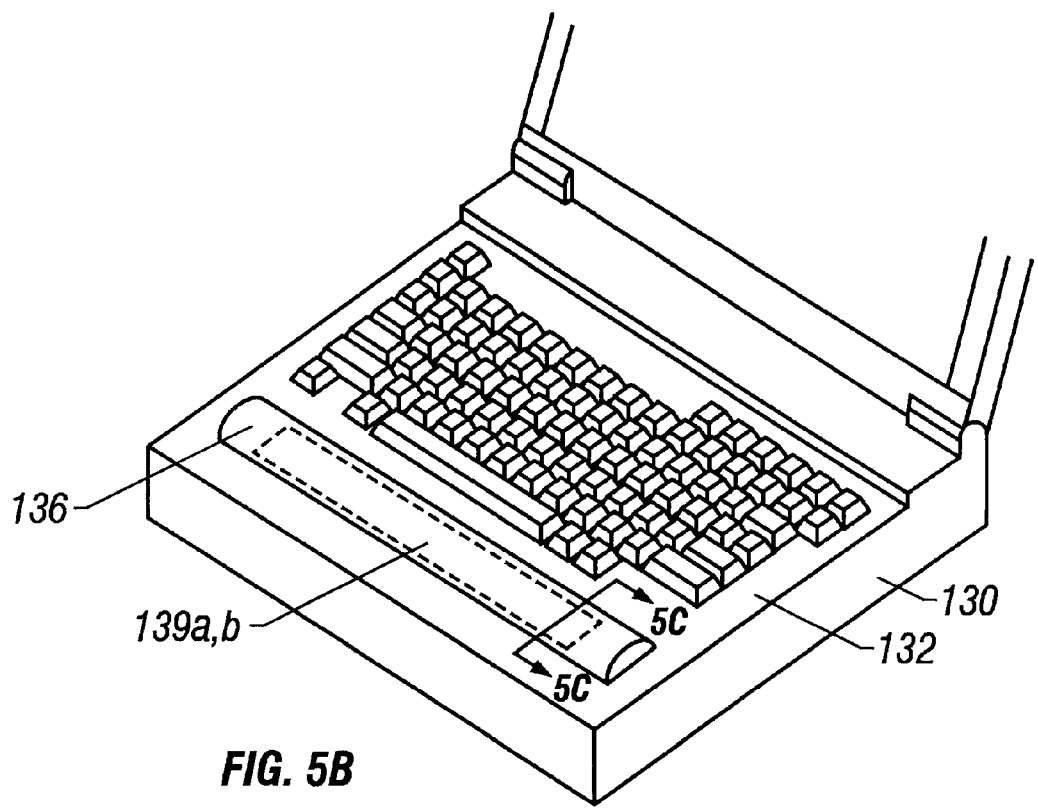
FIG. 5B shows the pad assembly embodiment of FIG. 4B, as installed in a notebook computer application.
Figure 5C:
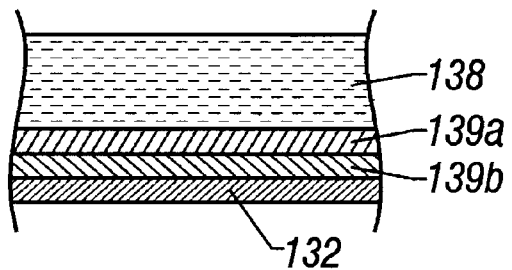
FIG. 5C shows the cross sectional view of a detachable wrist rest attaching to strip on FIG. 6 shows an embodiment of the present invention that accommodates a portable surface of a notebook computer. electronic device with a center trackball, joystick, or touchpad.

FIG. 4B shows an alternative embodiment of pad assembly 136. In this embodiment, pad assembly 136 includes pad 138 coupled to a strip 139a of the loop portion of hook-and-loop material of the type commonly known as "VELCRO." In this embodiment of the present invention, the hook portion of the VELCRO strip 139b is coupled to the keyboard bezel 132 of portable electronic device 130. Pad assembly 136 couples to the keyboard bezel 132 of portable electronic device 130 by engaging the loop portion of the VELCRO strip 139a that is coupled to the pad 138 with the hook portion of the VELCRO strip 139b that is coupled to the keyboard bezel 132. FIG. 5B shows the FIG. 4B embodiment of the wrist rest assembly in a notebook computer application.

Figure 6:
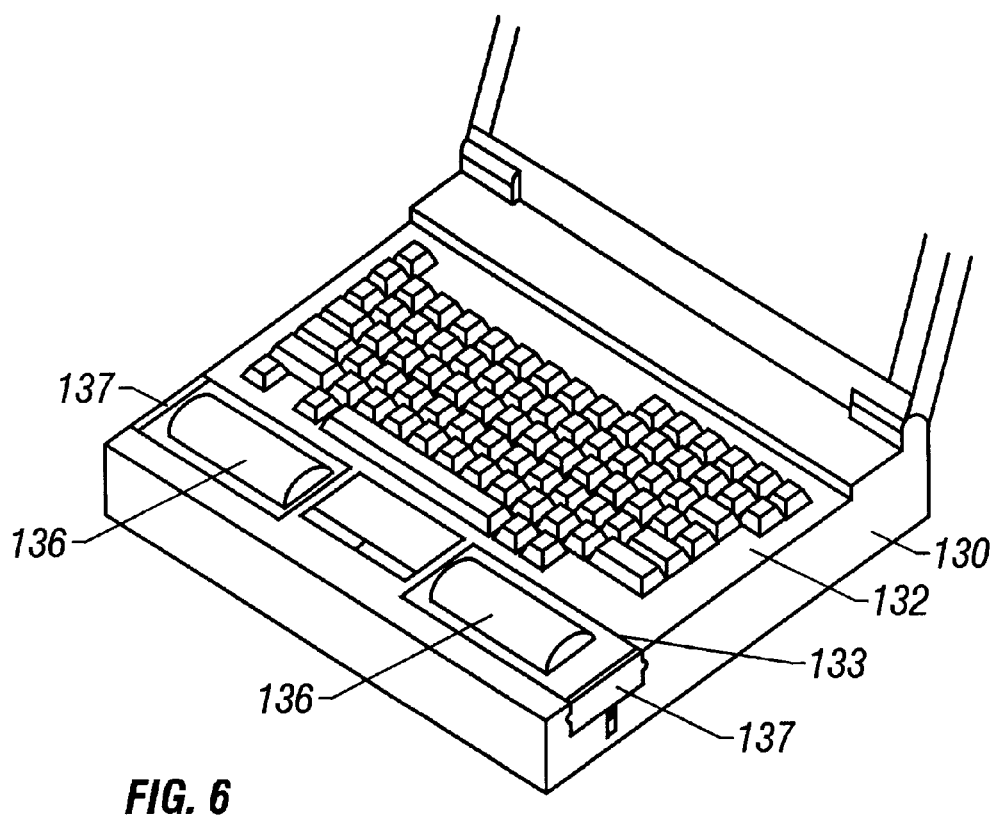

FIG. 6 shows an alternative embodiment of the present invention, identical in all respects to the embodiment shown in FIGS. 3–5A, except that keyboard bezel 132 includes a left and right recess 133 that hold left and right padded wrist rest assemblies 136. Left and right wrist rest assemblies 136 are installed into computer 130 at the left and right side, respectively, and are captured by left and right retainers 137. This embodiment might be preferable in a notebook computer, laptop computer, or other portable electronic device that includes structure or a functional element (such as a trackball, touchpad, or joystick) at the lower center of the device. In this type of electronic device, as shown in FIG. 6, the left and right padded wrist rest assemblies 136 are thus installed adjacent and at either side of the center functional element.

Figure 7:
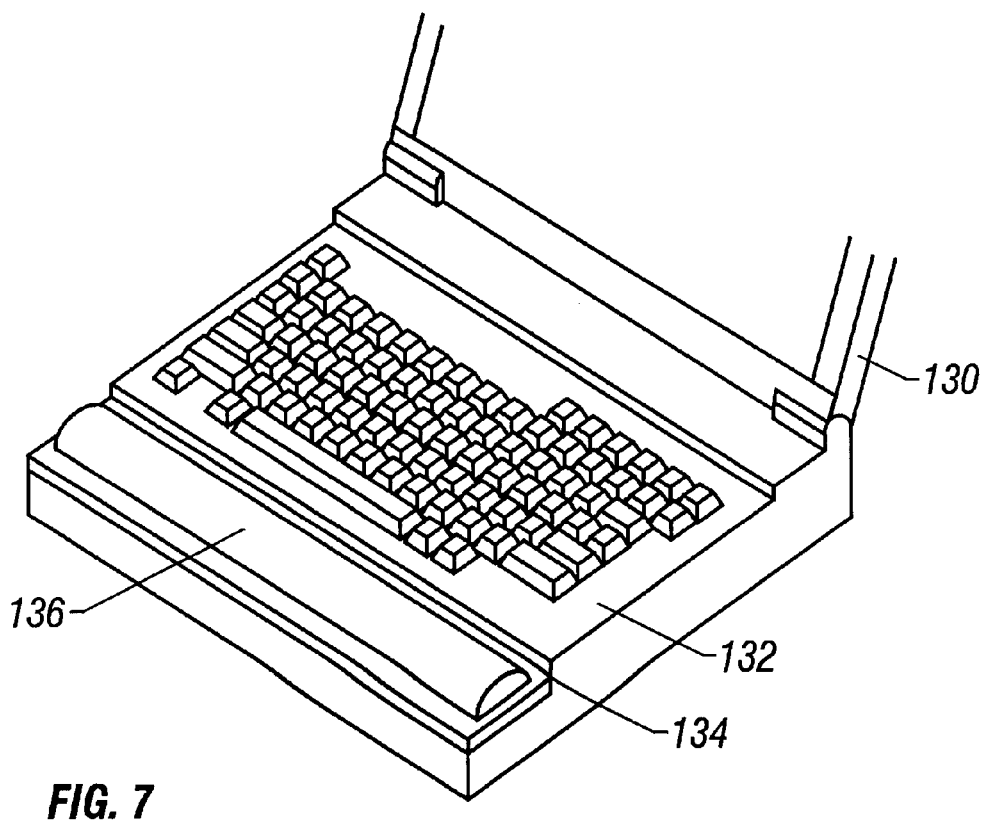
FIG. 7 is a fourth embodiment of the present invention in a notebook computer application.

FIG. 7 shows an alternative embodiment of the present invention, again in a notebook computer application. As shown in FIG. 7, notebook computer 130 includes keyboard bezel 132, which includes a stepped-down area 134 across the front of the computer. Padded wrist rest assembly 136 is coupled to the stepped-down bezel area 134. Like the preferred embodiments shown in FIGS. 3–6, padded wrist rest assembly 136 is sized such that it does not interfere with a user's ability to close notebook computer 130.

Figure 8:
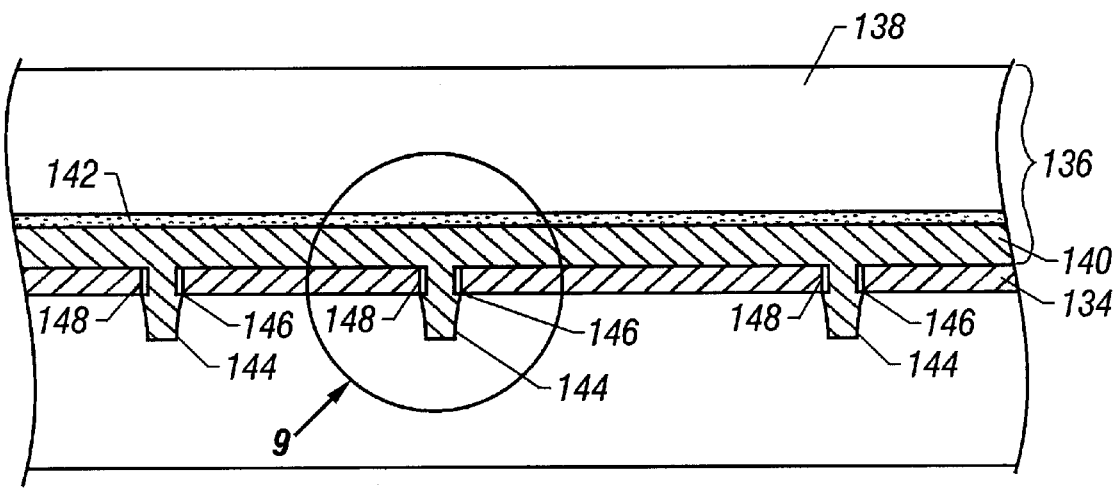
FIGS. 8 and 9 are enlarged cross-sectional details showing an interface design of the present invention.

FIG. 8 shows a cross-sectional view of a preferred method of attaching padded wrist rest assembly 136 to stepped-down bezel area 134, in the alternative embodiment of the present invention shown in FIG. 7.

Figure 9:
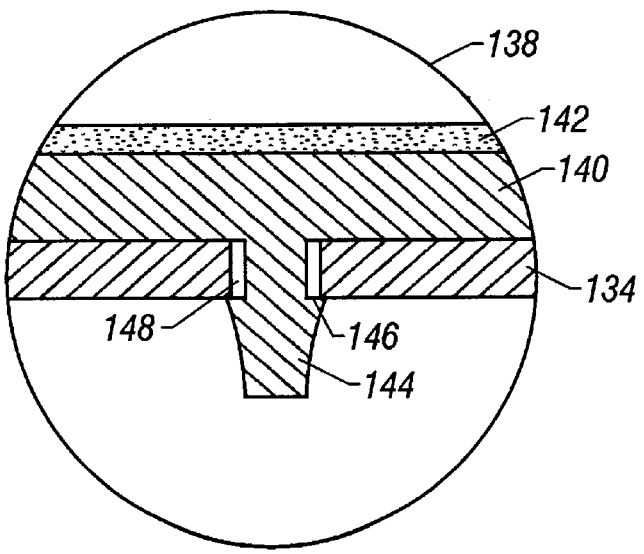

As shown in FIG. 8, pad 138 couples to base 140 via an adhesive layer 142. Base 140 includes a plurality of pegs 144, each having a shoulder 146. Pegs 144 interface with suitably located holes 148 molded into keyboard bezel 132 at stepped-down bezel area 134. Pegs 144, peg shoulders 146, and holes 148 are sized such that when base 140 is aligned and pressed or forced together with stepped-down bezel area 134, pegs 144 are inserted into holes 148, capturing base 140 by virtue of peg shoulders 146. FIG. 9 is an enlarged cross-sectional detail of the interface between the base 140, keyboard bezel stepped-down area 132, peg 144, peg shoulder 146, and hole 148.

Base 140, with pegs 144, is preferably a one-piece molded plastic part, of a moldable material with compression and memory characteristics that allow the shoulder 146 on the pegs 144 to be compressed sufficiently to allow the shoulder 146 to pass through hole 148 and then spring back to its original shape after passing through holes 148, thereby holding padded wrist rest assembly 138 in close contact with keyboard bezel stepped-down area 134.

In the preferred embodiments of the present invention shown in FIGS. 3, 4A, 5A, and 6, when the padded wrist rest assembly 136 becomes worn or needs replacement or maintenance, the user can simply remove retainer 137 and slide padded wrist rest assembly 136 out from recess 133. In the alternative embodiment of the present invention shown in FIGS. 7, 8, and 9, when the padded wrist rest assembly 136 becomes worn, the user can remove the assembly 136 by inserting a flat-bladed screwdriver, table knife, or other relatively thin tool between the keyboard bezel and the base 140, and carefully pry the padded wrist rest assembly loose from the keyboard bezel 132. A replacement padded wrist rest assembly 136, purchased by the user from a computer supply store or from the computer manufacturer, could then be slid or snapped into place using the same recess 133 or holes 148 as were used by the original padded wrist rest assembly 136.

Figure 10:
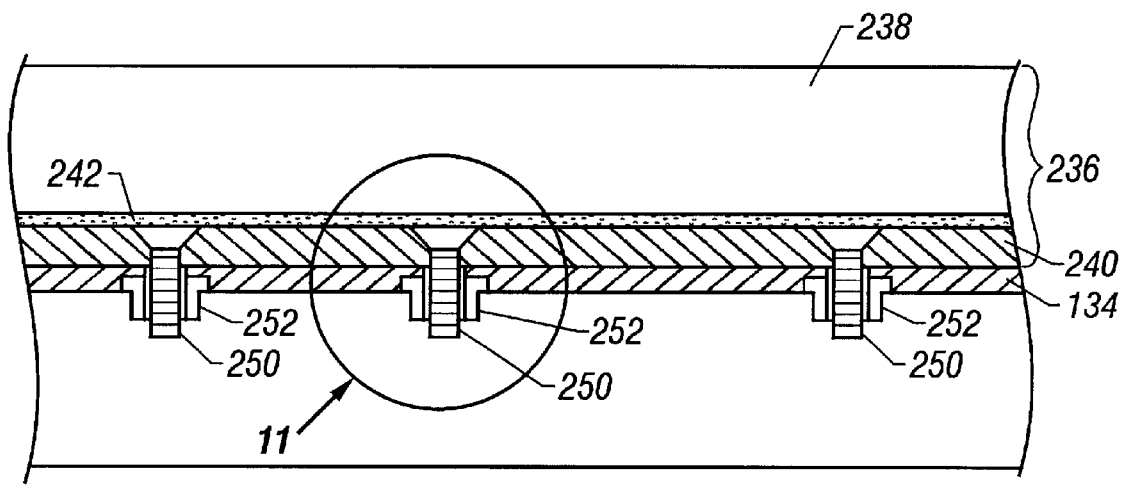
FIGS. 10 and 11 are enlarged cross-sectional details showing a second interface design of the present invention.

FIG. 10 shows yet another alternative embodiment of the padded wrist rest assembly 236. In FIG. 10, padded wrist rest assembly 236 includes pad 238 and base 240. Pad 238 is identical to pad 138 in the previous embodiments described herein. In this alternative embodiment, base 240 is preferably a one-piece molded plastic part, of the same material type and color as that used for the keyboard bezel 132. In the embodiment shown in FIG. 10, base 240 does not include pegs with shoulders, but rather, includes a plurality of molded-in countersunk holes, designed to accommodate flat-head screws that couple base 240 to keyboard bezel stepped-down area 134 (of FIG. 7).

Figure 11:
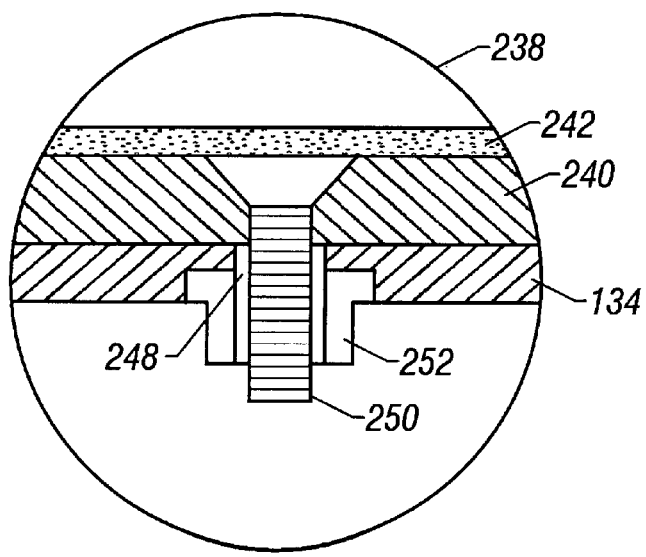

As shown in FIGS. 10 and 11, keyboard bezel stepped-down area 134 contains molded-in holes 248, into which female threaded captive fasteners 252 are pressed. Base 240 is first installed onto stepped-down bezel area 134 by using flat-head countersunk screws 250, which couple to pressed-in female threaded fasteners 252. This interface is shown in enlarged cross-section in FIG. 11. After base 240 is installed, pad 238 can be glued to base 240 using a suitable adhesive layer 242.

In the embodiment of the present invention shown in FIGS. 10 and 11, when the wrist rest pad 238 becomes worn or needs to be replaced, the user can remove the pad 238 by carefully cutting the pad 238 off and exposing the screws 250 that couple base 240 to keyboard bezel stepped-down area 134. The removed pad 238 would then be discarded. The user unscrews screws 250 to remove base 240, which is then discarded. The user can then replace the base and pad using a replacement kit purchased from a computer supply store or the laptop manufacturer, and following the above procedure.

In this embodiment, a wrist rest replacement kit comprises base 240, wrist rest pad 238, an appropriate number of screws 250, an appropriate amount of adhesive 242, and removal and reinstallation instructions.

Figure 12:
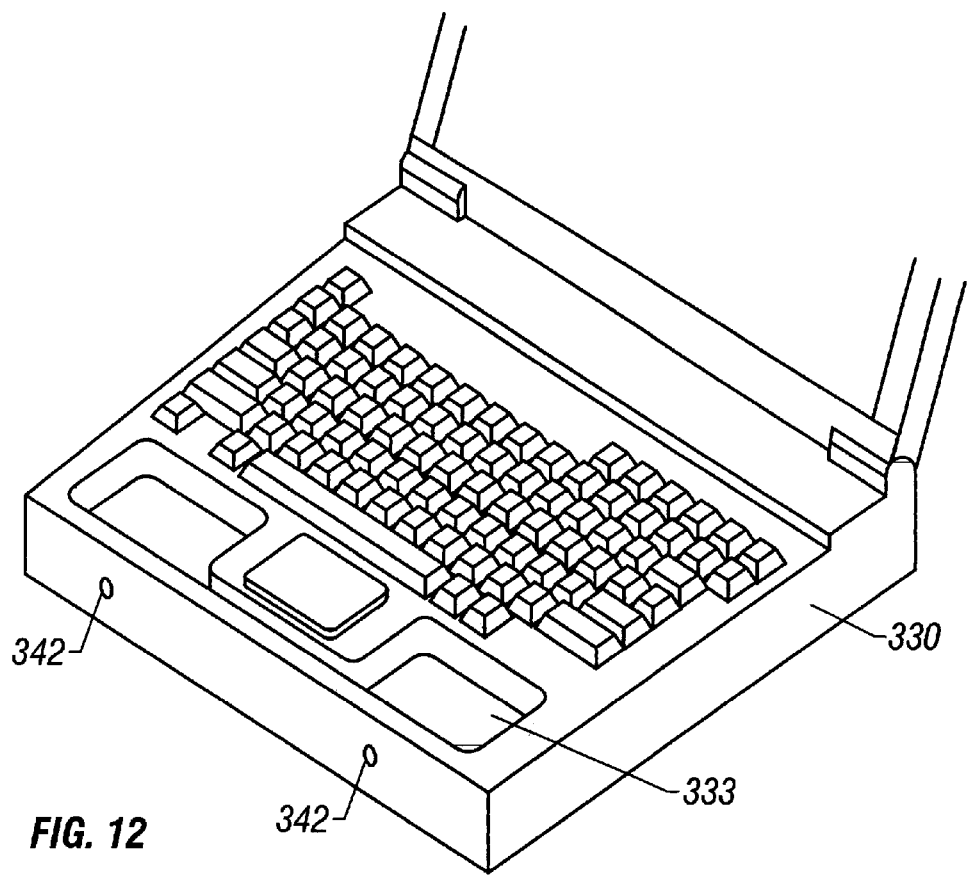
FIGS. 12, 13, and 14 show an alternative embodiment of the present invention.
Figure 13:
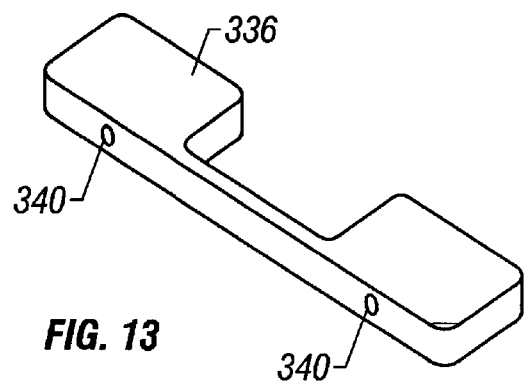
Figure 14:
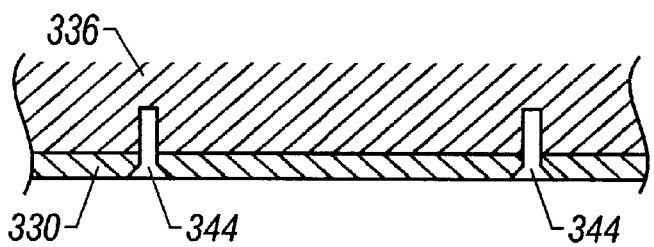

FIGS. 12, 13, and 14 show a final alternative embodiment of the present invention in a notebook computer application. As shown in FIGS. 12 and 13, notebook computer 330 includes a recess 333 designed to interface with wrist rest assembly 336. Wrist rest assembly 336 includes a plurality of threaded receptacles 340, which align with through holes 342 when wrist rest assembly 336 is installed. Threaded fasteners 344 hold wrist rest assembly 336 in place as shown in FIG. 14. Although FIGS. 12–14 depict fastening locations generally located at the front of notebook computer 330, one skilled in the art will appreciate that holes 342 and threaded receptacles 340 could be located on the sides and/or bottom of computer 330 without departing from the present invention.

One skilled in the art will recognize that the present invention is an integral padded wrist rest that is intended to be integral to and attached to a portable electronic device until purposefully removed by the user. While the above disclosure describes various embodiments of the present invention ranging from a pad assembly coupled to an electronic device via a VELCRO strip to a pad/base assembly coupled to an electronic device using a slot/retainer arrangement, shouldered pegs, or threaded fasteners, there are a number of alternative ways to attach a padded wrist rest to a portable electronic device in such a manner to cause the wrist rest to remain coupled to the electronic device until purposefully removed by the user. The present invention is intended to encompass all those attachment designs that are readily apparent to one skilled in the art, after having read this disclosure and/or practiced the present invention.

In sum, the present invention is an integral, padded wrist rest that is designed for use with a laptop or notebook computer, or other electronic device that employs a user interface that requires extensive or repetitive hand or finger movements. The present invention is not intended to be removed in the normal course of use, but can be removed and replaced by an ordinary user with ordinary mechanical skills, using either no tools or ordinary household tools. The present invention is a padded wrist rest that is integral with a portable electronic device, meaning that the wrist rest is sold with the device and does not have to be removed from the device to close and store the device. The present invention comprises a pad preferably manufactured from encapsulated gel, which also serves to sink unwanted heat away from the user and provides shock protection for the electronic display, or it can be manufactured from closed-cell foam, fabric-covered padding, vinyl-covered padding, or leather-covered padding, that is coupled to the electronic device. The present invention may also include a base having a lower surface and an upper surface, in which case the pad is coupled to the upper surface of the base. The base is than either slid, screwed or snapped into the portable electronic device, which includes structure that captures and holds the base-and-pad assembly to the device.

Other embodiments of the invention will be apparent to those skilled in the art after considering this specification or practicing the disclosed invention. The specification and examples above are exemplary only, with the true scope of the invention being indicated by the following claims.

We claim the following invention:

1. An integral padded wrist rest on a portable electronic device, said wrist rest comprising:
    at least one pad assembly comprising a pad and a base, said base including coupling means for attaching said pad assembly to said portable electronic, device in a removable fashion; and
    wherein at least said base of said pad assembly is received in a recess defined by said electronic device; and further wherein:
    said electronic device further defines a longitudinal slot in said recess;
    said base includes at least one longitudinal tab; and
    wherein said tab and said base are received in said slot and said recess in a telescoping manner.

2. The integral wrist rest according to claim 1, wherein said pad is selected from one of the following group: encapsulated gel, closed-cell foam, fabric covered padding, vinyl covered padding, and leather-covered padding.

3. The integral wrist rest according to claim 2, comprising:
   two pad assemblies;
   said electronic device defining two recesses; and further wherein
      a first of said pad assemblies is received in a first of said recesses and a second of said pad assemblies is received in a second of said recesses.

4. The integral wrist rest according to claim 3 wherein said coupling means comprises:
   at least one peg having a first diameter and a shoulder having a second diameter;
   said electronic device further defining at least one hole in said recess for receiving said at least one peg, said hole having a diameter larger than said first diameter and small than said second diameter.

5. The integral wrist rest according to claim 3 wherein said coupling means comprises:
   at least one threaded receptacle in said portable electronic device;
   said base including at least one countersunk hole therethrough; and
   a threaded fastener extending through said countersunk hole and engaging said threaded receptacle when said pad assembly is received in said recess.

6. An integral padded wrist rest on a portable electronic device, said wrist rest comprising:
   at least one pad assembly comprising a pad and a base, said at least one pad assembly received in a recess defined by said electronic device and said pad projecting above a surface of said portable electronic device for cushioning the wrist of a user;
   said base of said pad assembly further including a plurality of pegs attached to said lower surface of said base, said pegs having a first diameter and including a shoulder having a second diameter, said shoulder tapering from said second diameter to said first diameter;
   said portable electronic device further defining in said recess a corresponding plurality of holes and receiving said pegs therein, each of said plurality of holes having a third diameter smaller than said second diameter and larger than said first diameter such that said shoulders are captured and hold said base in said recess in a stationary but removable fashion.

7. The integral wrist rest according to claim 6 wherein said pad is selected from one of the following group: encapsulated gel, closed-cell foam, fabric covered padding, vinyl covered padding, and leather-covered padding.

8. The integral wrist rest according to claim 7 comprising:
   two pad assemblies;
   said electronic device defining two recesses; and further wherein
      a first of said pad assemblies is received in a first of said recesses and a second of said pad assemblies is received in a second of said recesses.

9. An integral padded wrist rest on a portable electronic device, said wrist rest comprising:
   at least one pad assembly comprising a pad and a base, said at least one pad assembly received in a recess defined by said electronic device and said pad projecting above a surface of said portable electronic device for cushioning the wrist of a user;
   said base further including a plurality of countersunk holes therethrough;
   said portable electronic device further including a like plurality of captive threaded receptacles; and
   a plurality of threaded fasteners extending through said countersunk holes in said base and engaging said captive threaded receptacles.

10. The integral wrist rest according to claim 9 wherein said pad is selected from one of the following group: encapsulated gel, closed-cell foam, fabric covered padding, vinyl covered padding, and leather-covered padding.

11. The integral wrist rest according to claim 10, comprising:
   two pad assemblies;
   said electronic device defining two recesses; and further wherein
      a first of said pad assemblies is received in a first of said recesses and a second of said pad assemblies is received in a second of said recesses.

* * * * *